Patented Aug. 18, 1942

2,293,319

UNITED STATES PATENT OFFICE 2,293,319

ELECTRICAL CIRCUIT INTERRUPTER

Hans Thommen, Baden, Switzerland, assignor to Aktiengesellschaft Brown, Boveri & Cie., Baden, Switzerland Application May 5, 1941, Serial No. 391,972
In Switzerland May 6, 1940

16 Claims. (Cl. 200—48)

In order to protect three-phase or multiphase systems against disturbances due to arc short-circuits, it has already been proposed to employ switch devices which cause a rapid interruption of the line and then reclose the circuit. The switch devices must be constructed in such a manner that the process of interruption and reclosing only occupies such a short time that the networks connected by the conductors cannot fall out of synchronism. This can be achieved to advantage by means of gas blast circuit breakers provided with a power and a voltage interruption point, the rapid opening and reclosing of the circuit being accomplished by the power interruption point. In the event of a disturbance occurring, the line can be switched out on one or more phases. Since the number of single-phase flash-overs on network conductors is much greater than the disturbances occurring simultaneously on all phases, provision is made to actuate the switch devices for the individual phases separately by means of relays in such a manner that for all disturbances only the smallest possible number of phases are interrupted by the circuit breakers necessary for interrupting the short-circuit in all phases. The danger of the network falling out of synchronism is thus diminished because those phases which are not affected by the disturbance still retain a synchronising force. If a single-phase disturbance occurs only one conductor will be switched out and then immediately switched in again. It has been proved that when a single phase is interrupted the de-ionization of the arc gap becomes detrimentally affected by the residual currents in the neighbouring phases which are transmitted capacitively, so that the de-ionizing time must be selected to be longer than if there is a disturbance and interruption of all phases. These difficulties increase with the voltage and the length of the transmission line so that there is a danger that with very high voltages and long conductors the de-ionization of the short circuit point may be prevented by the neighbouring phases when only a single phase is interrupted.

The present invention concerns a switching arrangement with power interruption and subsequent voltage disconnection for the protection of three or multi-phase conductor systems against disturbances caused by arc short-circuits. The disadvantages referred to in connection with known arrangements of this kind are overcome according to the invention by providing the switching arrangement for each phase with an earthing contact device which earths the conductor affected by the disturbance in dependence on the power which is interrupted.

Figure 1:
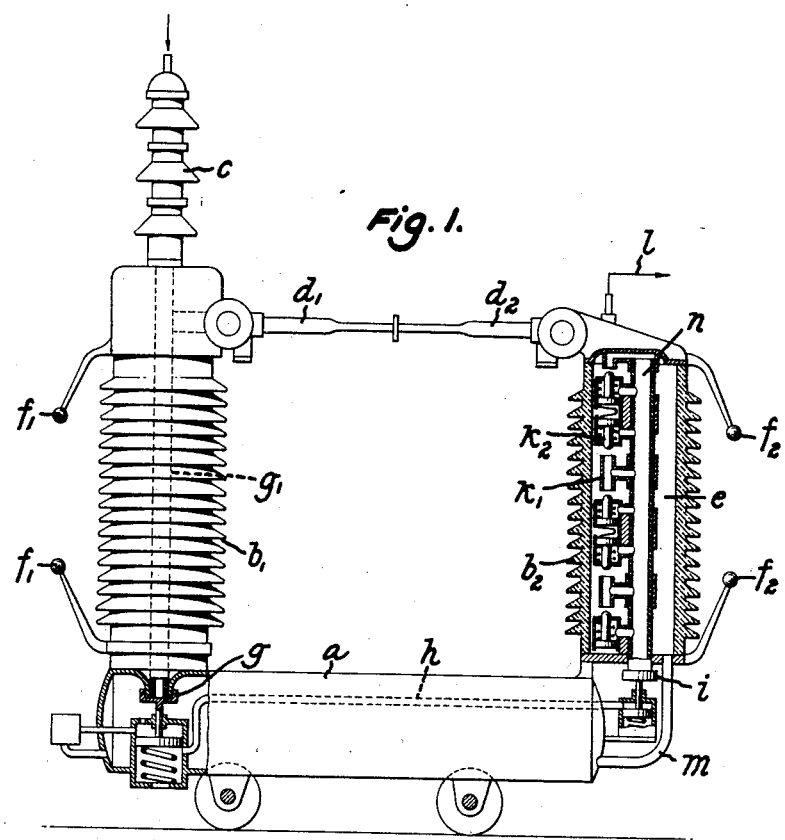
Figure 2:
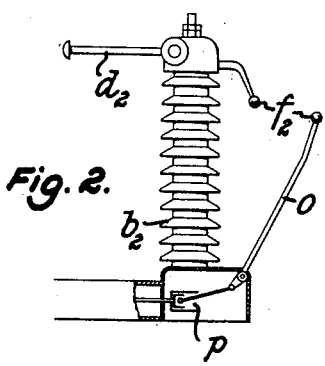
Figure 3:
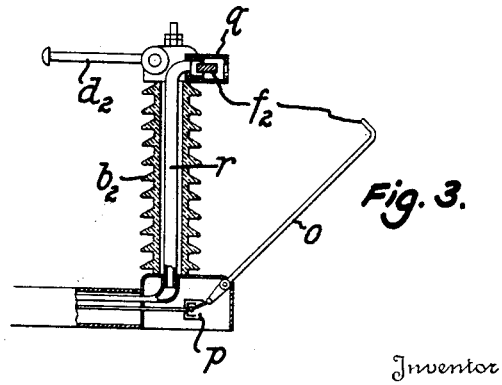

Constructional examples of the invention are illustrated diagrammatically in the accompanying drawing. In Fig. 1 a gas blast circuit breaker is shown in which the earthing arrangement is built into a supporting insulator for the pole of the voltage disconnecting switch which is located directly in the line to be protected. Modified forms of the invention are illustrated in Figs. 2 and 3.

In Fig. 1 $a$ designates the pressure gas container for the switching device, this being conveniently constructed as a portable truck. By means of the supporting insulators $b_1$, $b_2$ the switching device comprising the air blast power circuit breaker $c$ with an optional number of sets of arcing contacts for interrupting the power, the series disconnecting switches $d_1$, $d_2$ for isolating the voltage and the compressed air earthing device $e$, are assembled on the air container $a$. The supporting insulators $b_1$, $b_2$ are provided with protective arc gaps $f_1$, $f_2$ respectively. All switch contacts are operated electro-pneumatically by means of the main valve $g$. An insulating pipe $g_1$ passes the compressed gas from the container $a$ via the valve $g$ to the power arcing contacts of the circuit breaker $c$, these being thus actuated by and subjected to a gas blast; the compressed gas also passes to the operating pistons of the isolating switch blades $d_1$, $d_2$ and through the pipe $h$ to the control piston of the exhaust valve of the earthing contact device $e$. The power circuit breaker $c$, the disconnecting switch blades $d_1$, $d_2$ for isolating the voltage and the operating mechanism for these elements are only shown diagrammatically in the drawing and can be constructed in any suitable manner; the main valve $g$ can also be located in another position. The power circuit breaker $c$ is built for rapidly opening and closing the circuit. The earthing device $e$ is contained in the supporting insulator $b_2$ for the arm $d_2$ of the voltage disconnecting switch which is connected directly to the line conductor $l$. The earthing contacts are also closed and opened in the presence of compressed gas, so that the earthing device can safely interrupt the capacitive residual current flowing through it. For this purpose the supporting insulator $b_2$ is permanently in communication with the reservoir $a$ through the pipe $m$ and is thus filled with compressed gas. The exhaust valve $i$ is located at the end of an insulating tube $n$ which passes lengthwise through the supporting insulator $b_2$, this tube also serving to carry the contacts $k_1$, $k_2$ of the earthing device. The stationary contacts $k_1$ are tubular contacts the bores of which are in communication with the insulated tube $n$. The movable contacts $k_2$ are piston contacts which slide in guide cylinders fixed to the tube $n$, these being also connected by passages with the tube $n$. The movable contacts $k_2$ are subjected on both sides to a stream of compressed gas and are maintained in the open position by means of springs. The contacts $k_1$, $k_2$ of the earthing device are closed when the hollow space inside the supporting insulator is exhausted by opening the valve $i$ so that the pressure on the free side of the movable contacts $k_2$ opposite to that on which the springs act predominates.

When a disturbance occurs on the line $l$ the electro-pneumatic valve $g$ operates and opens the contacts of the power circuit breaker $c$, the blades $d_1$, $d_2$ of the voltage isolating switch remaining closed, and at the same time the gas blast for extinguishing the arc is released. Pressure gas thus also passes above the control piston of the main valve $g$ and through the pipe $h$ to the upper side of the control piston of the exhaust valve $i$ belonging to the earthing device $e$. The insulating tube $n$ and the space surrounding the movable contacts $k_2$ on the spring-loaded side of the latter are thus relieved of gas pressure and the contacts close, so that the line conductor $l$ is earthed over the metallic elements at the top and bottom of the supporting insulator. The pneumatic operation of the switch points by means of the main valve is so designed that when the conductor is disconnected the earthing device is also actuated and the operation is controlled in such a manner that the line is earthed directly after the arc is extinguished and only for a short period. If, as with the constructional example described, the circuit breaker is constructed for rapid disconnection and reclosing, provision must be made so that directly after the power circuit breaker has opened for the first time the closed earthing contact device is opened again before the power circuit breaker recloses. The number of switch elements $k_1$, $k_2$ arranged in series in the earthing device depends upon the magnitude of the capacitive residual current which is to be interrupted.

Instead of locating the earthing device inside the supporting insulator $b_2$ as shown in Fig. 1 it is also possible to employ a special insulator for this purpose. The construction of the control mechanism is quite optional and not restricted to that illustrated in the drawing. Both contacts of each arcing point in the earthing device can be movable and tubular if desired.

Although in the embodiment of the invention shown in Fig. 1 the voltage isolating point is so constructed that it also serves as the earthing contact place, it is also possible to provide a special switch for this purpose. For instance the electrodes of the protective spark gap provided for the supporting insulator can be used as contacts for the earthing device, as shown in the arrangements illustrated in Figs. 2 and 3.

With the arrangement shown in Fig. 2, one of the electrodes of the spark gap $f_2$ is fixed to the end of the switch arm $o$ which is actuated pneumatically in dependence upon the operation of the power circuit breaker $c$ by means of the control piston $p$ and a suitable transmission mechanism, so as to obtain the same effect as that described in connection with the arrangement shown in Fig. 1. In order to improve the extinguishing effect when the contacts of the earthing device are opened and the residual current is interrupted it is possible to locate the stationary electrode of the spark gap in a switch chamber which can be made of a gas-emitting material. The same object can also be achieved by subjecting the stationary contact of the spark gap to a blast of compressed gas by means of the arrangement shown in Fig. 3. The stationary electrode is located inside an insulating nozzle $q$ to which compressed gas is supplied through the tube $r$ when the switch arm $o$ of the earthing switch reaches the open position.

I claim:

1. Electrical switch for the protection of multiphase lines comprising, in each phase, a pneumatically actuated power circuit breaker, a voltage disconnecting switch, an earthing switch, and means for actuating the earthing switch into closed position for a short interval of time upon the opening of the power circuit breaker.

2. Electrical switch for the protection of multiphase lines comprising, in each phase, a pneumatically actuated power circuit breaker, a voltage disconnecting switch, an earthing switch, and means energized upon actuation of the power circuit breaker for closing the earthing switch for a short interval of time.

3. Electrical switch for the protection of multiphase lines comprising, in each phase, a pneumatically actuated power circuit breaker, a voltage disconnecting switch, an earthing switch, and pneumatic means energized upon actuation of the power circuit breaker for closing the earthing switch for a short interval of time.

4. Electrical switch for the protection of multiphase lines comprising, in each phase, a pneumatically actuated power circuit breaker, a voltage disconnecting switch, an earthing switch having arcing contacts positioned to open in a blast of gas, and means for actuating the earthing switch into closed position for a short interval of time upon the opening of the power circuit breaker.

5. Electrical switch for the protection of multiphase lines comprising, in each phase, a pneumatically actuated power circuit breaker including means for rapidly opening and reclosing the circuit breaker upon occurrence of a line disturbance, a voltage disconnecting switch in series with said circuit breaker, an earthing switch, and means for closing and reopening said earthing switch in the interval between the opening and reclosing of said circuit breaker.

6. Electrical switch as defined in claim 5 in which the earthing switch is carried by the insulating support for that portion of the voltage disconnecting switch which is directly connected to the line.

7. Electrical switch as defined in claim 5 in which the earthing switch is mounted within a hollow insulator supporting that portion of the voltage disconnecting switch which is directly connected to the line.

8. Electrical switch as defined in claim 5 in which the earthing switch is mounted within a hollow insulator supporting that portion of the voltage disconnecting switch which is directly connected to the line, and means is provided for supplying a blast of compressed gas to the contacts of the earthing switch at the time of opening.

9. Electrical switch as defined in claim 5 in which the earthing switch comprises a plurality of contact points in series mounted within a hollow insulator supporting that portion of the voltage disconnecting switch which is directly connected to the line.

10. Electrical switch as defined in claim 5 in which the earthing switch comprises a plurality of contact points in series mounted within a hollow insulator supporting that portion of the voltage disconnecting switch which is directly connected to the line, and means is provided for supplying a blast of compressed gas to the contacts of the earthing switch at the time of opening.

11. Electrical switch as defined in claim F including spaced electrodes providing a protective spark gap for the insulating support for that portion of the voltage disconnecting switch which is directly connected to the line and means for bringing said electrodes into contact to form said earthing switch.

12. Electrical switch as defined in claim 5 including spaced electrodes providing a protective spark gap for the insulating support for that portion of the voltage disconnecting switch which is directly connected to the line, one of said electrodes being movable into contact with the stationary electrode to form said earthing switch.

13. Electrical switch as defined in claim 5 including spaced electrodes providing a protective spark gap for the insulating support for that portion of the voltage disconnecting switch which is directly connected to the line, one of said electrodes being movable into contact with the stationary electrode to form said earthing switch, and means providing an arcing chamber around the stationary electrode.

14. Electrical switch as defined in claim 5 including spaced electrodes providing a protective spark gap for the insulating support for that portion of the voltage disconnecting switch which is directly connected to the line, one of said electrodes being movable into contact with the stationary electrode to form said earthing switch, means providing an arcing chamber around the stationary electrode, and means for supplying a blast of compressed gas to said arcing chamber.

15. Electrical switch for the protection of multiphase lines comprising, in each phase, a pneumatically actuated power circuit breaker including means for rapidly opening and reclosing the circuit breaker upon occurrence of a line disturbance, a compressed gas container for supplying gas to operate said circuit breaker, a voltage disconnecting switch in series with said circuit breaker, a hollow insulating support carrying that portion of the voltage disconnecting switch which is directly connected to the line, an earthing switch comprising a plurality of contact assemblies in series positioned within said hollow insulating support, said contact assemblies comprising movable piston-type contacts normally spring-urged into open position and complementary fixed contacts, means connecting the interior of said insulating support with said compressed gas container, a pneumatically controlled exhaust valve connecting the interior of said insulating support with the atmosphere, and means for opening said exhaust valve for a short period of time upon the opening of said circuit breaker whereby the contacts of the earthing switch are closed and reopened in the interval between the opening and reclosing of said circuit breaker.

16. Electrical switch for the protection of multiphase lines comprising, in each phase, a pneumatically actuated power circuit breaker including means for rapidly opening and reclosing the circuit breaker upon occurrence of a line disturbance, a compressed gas container for supplying gas to operate said circuit breaker, a voltage disconnecting switch in series with said circuit breaker, a hollow insulating support carrying that portion of the voltage disconnecting switch which is directly connected to the line, an earthing switch comprising a plurality of contact assemblies in series positioned within said hollow insulating support, said contact assemblies comprising movable piston-type contacts normally spring-urged into open position and complementary fixed contacts carried on hollow tubes and connecting the interior of said insulating support with the interior of said tube, means connecting the interior of said insulating support with said compressed gas container, a pneumatically controlled exhaust valve connecting the interior of said tube with the atmosphere, and means interconnected with the circuit breaker opening and reclosing means for opening and reclosing said exhaust valve in the interval between the opening and reclosing of said circuit breaker whereby the contacts of the earthing switch are closed and reopened in the interval between the opening and reclosing of said circuit breaker.

HANS THOMMEN.